United States Patent [19]

Self

[11] 4,402,633
[45] Sep. 6, 1983

[54] METHOD OF INSTALLING A ROCK BOLT

[75] Inventor: James M. Self, Taylor, S.C.

[73] Assignee: Tanner Chemical Company, Greenville, S.C.

[21] Appl. No.: 235,015

[22] Filed: Feb. 17, 1981

[51] Int. Cl.³ .............................................. E21D 20/02
[52] U.S. Cl. .................................... 405/261; 166/295; 206/219
[58] Field of Search ................ 405/260, 261; 206/219, 206/220; 106/87; 166/295, 300

[56] References Cited

U.S. PATENT DOCUMENTS

| | | | |
|---|---|---|---|
| Re. 15,844 | 5/1924 | Ashenhurst | 106/87 |
| 1,748,614 | 2/1930 | Nelson | 106/87 |
| 1,844,662 | 2/1932 | King | 106/87 |
| 3,141,513 | 7/1964 | Davis | 166/295 |
| 3,871,518 | 3/1975 | Murray et al. | 206/219 |
| 4,136,774 | 1/1979 | Ghoshal | 405/261 X |
| 4,303,354 | 12/1981 | McDowell, Jr. | 405/261 |

FOREIGN PATENT DOCUMENTS 1041209  9/1966  United Kingdom ................ 106/87

Primary Examiner—James A. Leppink
Assistant Examiner—George A. Suchfield
Attorney, Agent, or Firm—Harry B. Keck

[57] ABSTRACT

A method for fastening rock bolts in geological strata and a two-compartment package containing expansible resinous composition including unsaturated polyester resin syrup, aluminum chlorohydroxide and activator for the resin syrup. The method introduces an expansible composition into an opening in the geological strata, and foams the composition in engagement with a rock bolt. The preferred method introduces a two-compartment package of the composition into the opening in the geological strata, ruptures the package with the rock bolt, and mixes the composition by mechanical motion of the rock bolt.

5 Claims, 6 Drawing Figures

METHOD OF INSTALLING A ROCK BOLT

BACKGROUND OF THE INVENTION

1. Field of the Invention

This invention relates to a method for installing a rock bolt in geological strata and to a package containing resinous material for practicing the method.

2. Description of the Prior Art

Rock bolts of roof bolts are employed in mining operations and elsewhere to maintain geological strata in alignment and to support such geological strata. Such rock bolts are installed in a bore hole which is drilled into and through the geological strata, usually at an angle with respect to the geological fault lines of the strata. Some rocks bolts are provided with mechanically expandable anchoring devices at the forward end, within the bore hole, for retaining the rock bolt rigidly within the bore hole. Sometimes an inorganic cement has been introduced into the bore hole to assist in retaining the rock bolt, U.S. Pat. No. 2,682,152. Rupturable packages containing inorganic cementitious materials have been employed in the bore hole, U.S. Pat. Nos.: 4,126,003, 4,126,005, and 4,127,001. Packages containing the cementitious material are ruptured by the rock bolt which is agitated to mix the cementitious ingredients; thereafter the rock bolt is retained in place until the cementitious material hardens and retains the bolt. Organic polymerizable resinous materials such as epoxy resins, polyurethane resins, unsaturated polyester resin syrups have been employed in rupturable containers in a similar fashion, U.S. Pat. Nos.: 3,618,326; 3,302,410; 4,211,681; and 4,136,774. These hardenable materials are generally identified as grouting materials in the rock bolting art. The organic polymerizable resins are preferred because of the speed with which they gel and harden to secure the rock bolt in its bore hole; because of their ease of mixing within the bore hole; and because of their acceptable storage life prior to use. Such compositions customarily include two reactive ingredients which are provided in a common package having two compartments separaed by a rupturable barrier. The organic polymerizable resinous materials are considerably more expensive than the inorganic cementitious materials. The organic polymerizable resinous materials are customarily blended with inexpensive, inert finely divided filler substances such as sand, silica and the like. The organic polymerizable resinous materials normally experience a shrinkage upon cure which can be a disadvantage in their use. Use of expandable resinous compositions has been proposed to overcome the disadvantage of the characteristic shrinkage. For example, in U.S. Pat. No. 4,136,774, the use of ammonium bicarbonate and sodium bicabonate is proposed for the purpose of generating a carbon dioxide gas to foam the resinous material. Low boiling point liquids have been considered but rejected. The combination of unsaturated polyester resin with diisocyanate and polyalcohol or castor oil is described for generating expandable resinous compositions. A need for significant expansion of the grouting material upon cure is recognized in the same U.S. Pat. No. 4,136,774 where geological faults or fissures can result in an unstable anchoring for the rock bolt.

What is required in a roof bolt grouting composition is expansion of the composition during cure; suitable shelf life; relatively low cost; adequate structural properties after expansion in order to retain the rock bolt in a firm anchor; and facility in usage.

STATEMENT OF THE INVENTION

According to the present invention, I employ as an expandable, thermosetting rock bolt grouting composition a mixture of:
  Unsaturated polyester resin syrups;
  Finely divided inorganic carbonate or bicarbonate;
  Finely divided aluminum chlorhydroxide, normally provided in aqueous dispersion;
  and an appropriate catalyst for initiating the cure of the unsaturated polyester resin syrup;
  optionally some aluminum chloride may be added to this composition to improve the foaming properties.

Preferred compositions are described in my corresponding U.S. patent application Ser. No. 281,726 filed July 9, 1981, now U.S. Pat. No. 4,347,331, issued Aug. 31, 1982 and assigned to the assignee of this invention.

The ingredients, when mixed, rapidly harden and expand in volume by about 50% or more. The actual expansion can be adjusted by proportioning the ingredients. The unsaturated polyester resin syrup is maintained in a package separate from the finely divided aluminum chlorhydroxide and the catalyst. In use, the rock bolt penetrates the package, ruptures a barrier between two compartments of the package and is agitated to bring about intimate mixture of the ingredients.

DESCRIPTION OF THE PREFERRED EMBODIMENTS

Example 1

A rock bolt resin package, containing two separate compartments, is filled with the following compositions:

| Compartment A (Component A) | |
| --- | --- |
| Unsaturated polyester resin syrup (Freeman Stypol resin 40-4612) | 2038 grams |
| Powdered calcium carbonate | 3338 grams |
| Activator (phenyl ethyl ethanolamine) | 9 grams |

The ingredients of component A are intimately mixed and introduced into one compartment of a resin package.

| Compartment B (Component B) | |
| --- | --- |
| Aluminum Chlorhydroxide | 3340 grams |
| Aluminum Chloride (32 B) | 250 grams |
| Surfactants | 12 grams |
| Catalyst (Benzoyl Peroxide) | 600 grams |

The ingredients of Component B are intimately mixed and introduced into a separate compartment of the resin package.

The resin package is sealed. The described composition has a shelf life in excess of six months so long as the catalyst and the aluminum chlorhydroxide are maintained separate from the unsaturated polyester resin syrup.

Three parts of component A are provided within the package for one part of component B.

After component A and B are mixed, the mixture begins to increase in volume. The gel time is about 1.5 minutes at 70° F. and the peak exotherm is about 160° F. The cured mixture has about 1.5 times the volume of the original composition. The cured mixture is hard, strong and has a density of about 60 to 65 pounds per cubic foot. A further advantage of the described composition is that it will cure in the presence of water.

Operation

Figure 1:
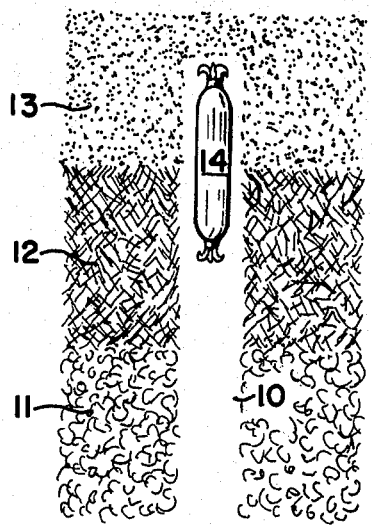
FIGS. 1, 2 and 3 are cross-section views of geologic strata having a bore hole and a rock bolt.
Figure 2:
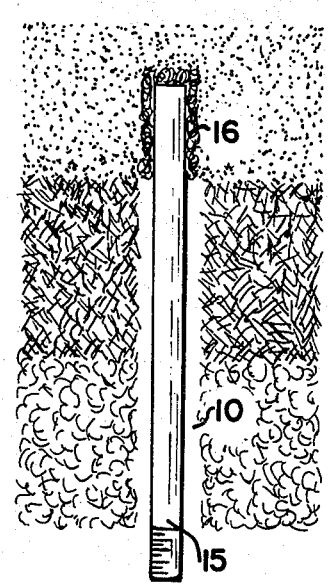
Figure 3:
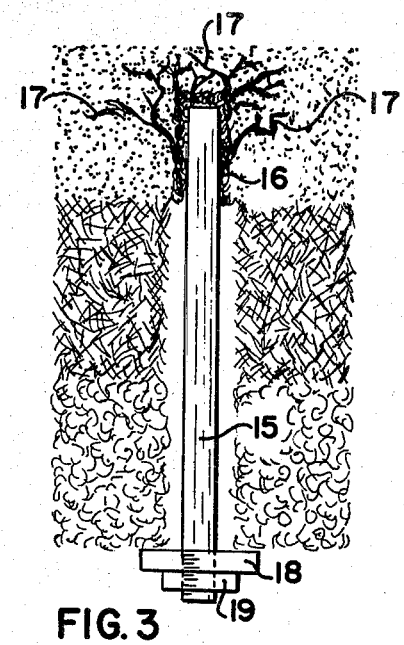

The operation of the present invention can be described by reference to the drawings wherein a bore hole 10 is cut in through several geologic strata 11, 12, 13. A resin package 14 is introduced into the forward end of the bore hole 10 as shown in FIG. 1. Thereafter, as shown in FIG. 2, a rock bolt 15 as introduced into the bore hole 10 to penetrate the package 14 and release the resinous ingredients 16 for mixing. Mixing can be accomplished by rapidly rotating or oscillating the rock bolt 15. After mixing has occurred, the rock bolt 15 is retained in position until the resinous ingredients 16 harden and expand. As shown in FIG. 3, the resinous mixture 16 expands and hardens in cracks and fissures 17. The rock bolt installation is completed by installing a rock bolt plate 18 and a threaded nut 19 on the rock bolt 15.

Figure 4:
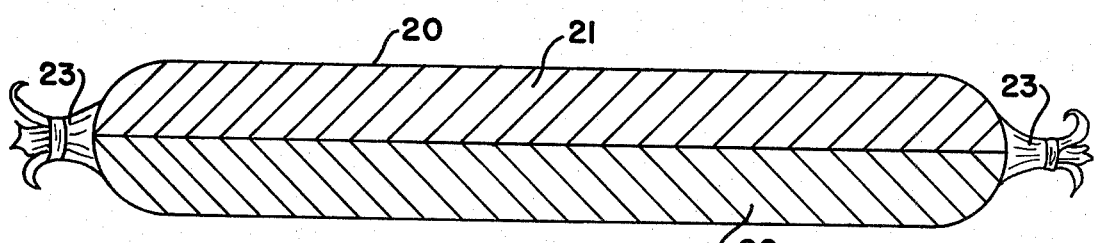
FIG. 4 is a perspective view of a typical resin package for the present invention.

One form of the resin package is shown in FIG. 4 wherein a casing 20, similar to a sausage casing, contains two separate chambers 21, 22. The casing 20 can be secured at the ends by means of a sausage casing knot or tie 23.

Figure 5:
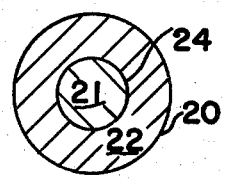
FIGS. 5 and 6 are cross-section views of typical resin packages for the present invention.
Figure 6:
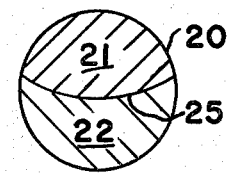

As shown in FIG. 5, one compartment 21 may be self contained within its own casing 24 and the other compartment 22 may be an annular compartment defined by the casings 20, 24. Alternatively as shown in FIG. 6, the outer casing 20 may have a barrier film 25 which separates the two compartments 21, 22.

The bore hole 10 normally is from 4 to 16 feet in length. The package 14 has a diameter less than that of bore hole 10 and has a length sufficient to provide the resin volume required for the bolt anchor. More than one resin package 14 may be introduced into any bore hole 10.

If the geological strata are fissured, porous or cracked, the quantity of resinous composition should be increased to allow the cured material to expand into the pores, cracks or fissures.

Ingredients

Side A Components

Unsaturated Polyester Resin Syrup

This is usually a solution of polymerizable unsaturated polyester resin in a co-polymerizable monomer such as styrene. The unsaturated polyester resin is usually the reaction product of a polycarboxylic acid or acid anhydride and a polyol. At least a portion of the polycarboxylic acid contains ethylenic unsaturation which permits cross linking of the resulting unsaturated polyester resin. Acids and anhydrides customarily are maleic acid, maleic anhydride, fumaric acid, phthalic acid, phthalic anhydride, isophthalic acid, terephthalic acid, and the like. The polyol ingredient may be a glycol such as ethylene glycol, propylene glycol, butylene glycol, polyethylene glycol, polypropylene glycol, or hydroxy terminated esters such as alkylene glycol or polyalkylene glycol or polyalkylene glycol esters of dicarboxylic acids, for example, the diesters of terephthalic acid and ethylene glycol.

Other unsaturated polyesters may be formed by combining ethylenically unsaturated monocarboxylic acids such as acrylic acid or methacrylic acid with polyhydric compositions such as bisphenols. Other unsaturated polyester resins can be prepared by reacting the diglycidyl ether of a bisphenol with ethylenically unsaturated carboxylic acid such as acrylic or methacrylic acid. Such compositions contain more than one ester linkage and are ethylenically unsaturated and hence can be characterized as unsaturated polyester resins.

The copolymerizable monomer whih is the carrier for the unsaturated polyester resin is usually an ethylenically unsaturated compound such as styrene, vinyl toluene, divinyl benzene, acrylic esters, methacrylic esters, acrylic acid, methacrylic acid, and the like. Customarily the copolymerizable monomer comprises from about 15 to 35 percent by weight of the unsaturated polyester resin syrup, with the unsaturated polyester ingredient comprising the remaining 85 to 65% by weight of the syrup. The syrup may also contain small quantities of polymerization inhibitors such as hydroquinone. The composition may also contain thixotropic additives such as silica aerogel. Suitable unsaturated polyester resin syrups are available from a variety of resin manufacturers in the United States.

Inorganic Bicarbonate or Carbonate

The present composition also employs an inorganic carbonate or bicarbonate preferably an alkaline earth carbonate or bicarbonate such as calcium carbonate, calcium bicarbonate, magnesium carbonate or magnesium bicarbonate. Other inorganic carbonates or bicarbonates which might be employed include carbonates and bicarbonates of lead, nickel, zinc, aluminum, potassium, sodium, and naturally occurring carbonates such as dolomite, limestone, marble, and the like. These materials are relatively inexpensive and readily available. In the course of the present reaction, the inorganic carbonate or bicarbonate is converted to carbon dioxide gas upon contact with the acidic aluminum chlorhydroxide which is contained in the B component. For the purposes of dispersion in component A, and for the purposes of rapid generation of the desired carbon dioxide gas, the inorganic carbonate or bicarbonate should be finely divided.

Polymerization Activator

It is preferred to include a polymerization activator in the A component mixture to assure prompt and complete polymerization of the mixed ingredients within the bore hole. In general any of the well known activators for unsaturated polyester resin syrup may be employed. The amount of the activator is from about 0.2 to 1.0 weight percent, based upon the weight of the unsaturated polyester resin syrup. The activator should be compatible with the catalyst selected for the system.

Side B Components

Aluminum Chlorhydroxide

Aluminum chlorhydroxide has the following general formula:

$Al_2(OH)_xCl_{6-x}$

Herein x is 1 to 5. Where the value of x is low, e.g., 1 to 2, the composition presents some handling difficulties although operability can be achieved. Where the value of x is above 5, the excessive acidity of the composition results in a reaction rate which is too fast to permit the desired expansion to occur. Compositions having a low value of x result in faster foaming and a greater amount of foaming than compositions wherein the value of x is higher.

Aluminum chlorhydroxide normally is available in an aqueous solution containing about 50% by weight of the aluminum chlorhydroxide and 50% water.

Surfactants

A substantial quantity of surfactant is preferred in the composition in order to achieve the required rapid mixing in the confined space available in the rock bolt bore hole. Surfactants can be polyalkylene ethers or silicone surfactants. The amount of surfactant ranges from about 0.05 to about 0.5% based on the weight of all of the ingredients in the compositions A and B.

Catalyst

A catalyst for the unsaturated polyester resin syrup should be provided in B component. The catalyst should be one which functions at ordinary temperatures and particularly at temperatures anticipated in the rock bolt bore hole. Benzoyl peroxide is a particularly useful catalyst. An abnormally high amount of catalyst should be employed to assure reaction of the composition in the rock bolt bore hole. For this purpose, the amount of catalyst should be from about 5 to 35 weight percent based upon the weight of the unsaturated polyester resin syrup.

Additives

The composition A or the composition B or both may be extending with other inert additives such as finely divided silica, glass, sand, flyash, and the like.

Aluminum Chloride

In one preferred embodiment of the present composition, some aluminum chloride is included in the B component mixture. Aluminum chloride appears to improve the foaming characteristics of some unsaturated polyester resin compositions. Aluminum chloride is available as an aqueous dispersion and is readily available from a variety of sources in varying concentrations. The dispersion having a 32° B density is useful.

Proportions

In establishing the proportions of ingredients in the present compositions, the cost of ingredients is one factor to be considered. The speed of reaction is another factor. The properties of the resulting hardened grouting material is another factor. In general the following ratios are useful.

The unsaturated polyester resin syrup should comprise from about 12 to 33 weight percent of the entire composition. The aqueous aluminum chlorhydroxide solution should comprise from about 4 to 30 percent by weight of the entire composition. The inorganic carbonate or bicarbonate should comprise about 10 to 45 percent by weight of the entire composition. Inert fillers should comprise about 25 to 50 weight percent of the entire composition.

Example II

| Composition A contains: | |
| --- | --- |
| Unsaturated polyester resin syrup | 2038 grams |
| Calcium Carbonate | 3338 grams |
| Activator | 9 grams |
| Composition B contains: | |
| Aluminum Chlorhydroxide | 400 grams |
| Surfactants | 8 grams |
| Benzoyl peroxide | 300 grams |

The bolt hole resin package contains four parts by weight of Composition A and one part by weight of Composition B. The package, after mixing of the ingredients, has a gel time of 1 minute 45 seconds. The observed expansion of volume is 1 to 1.2.

What is claimed is:

1. A method for securing metal bolt in a bore hole which comprises:
   A. Introducing into said bore hole the following ingredients:
   (1) Unsaturated polyester resin syrup;
   (2) Finely divided inorganic carbonate or bicarbonate;
   (3) An aqueous dispersion of aluminum chlorhydroxide;
   (4) A catalyst for initiating the cure of the said unsaturated polyester resin syrup;
   B. Engaging the said metal bolt with the said ingredients in an intimately mixed state before the said mixture of said ingredients hardens;
   C. Retaining said metal bolt in fixed engagement with said mixture until the said mixture expands, hardens and secures said bolt.

2. The method of claim 1 wherein the said inorganic carbonate or bicarbonate is alkaline earth carbonate or bicarbonate.

3. The method of claim 1 wherein the said ingredients (1) and (2) are introduced into said bore hole separately from said ingredients (3) and (4).

4. The method of claim 1 wherein the said unsaturated polyester resin comprises 12 to 33 weight percent of the said ingredients.

5. The method of claim 1 wherein the said ingredients also include aluminum chloride.

* * * * *